June 18, 1940.    E. J. RIORDAN    2,205,309
METHOD OF AND MEANS FOR CALIBRATING ELECTRICITY METERS
OR LIKE ELECTRICAL MEASURING INSTRUMENTS
Filed Oct. 12, 1938    4 Sheets-Sheet 1
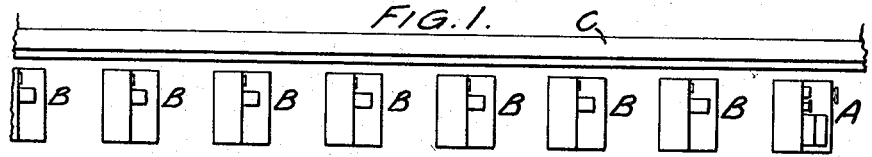
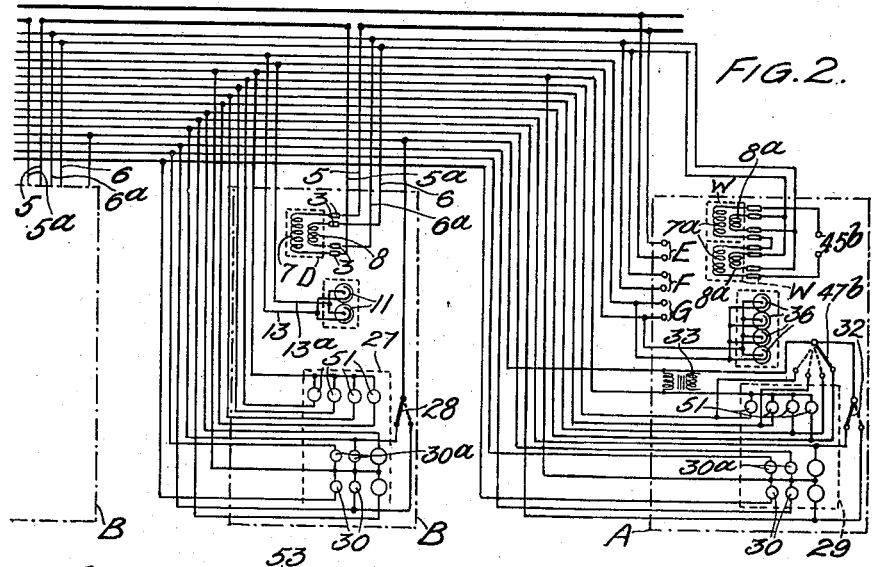

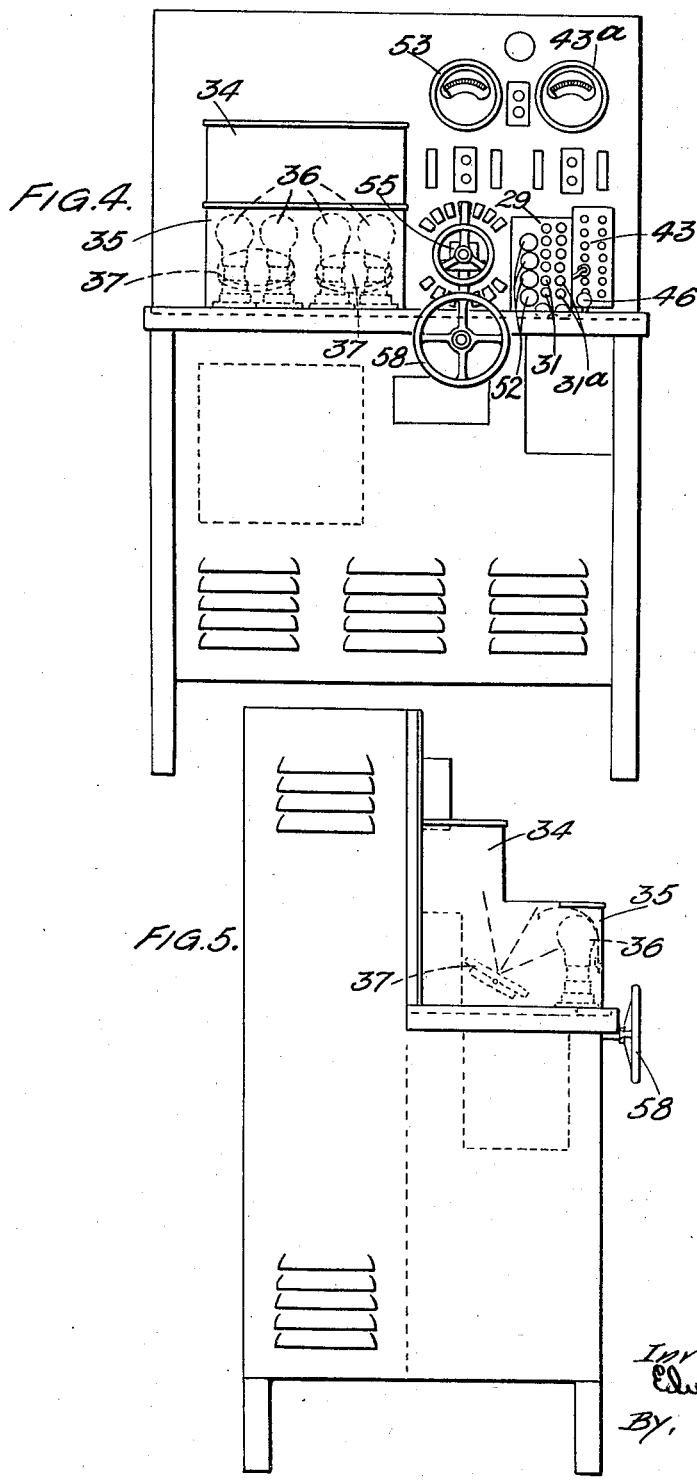

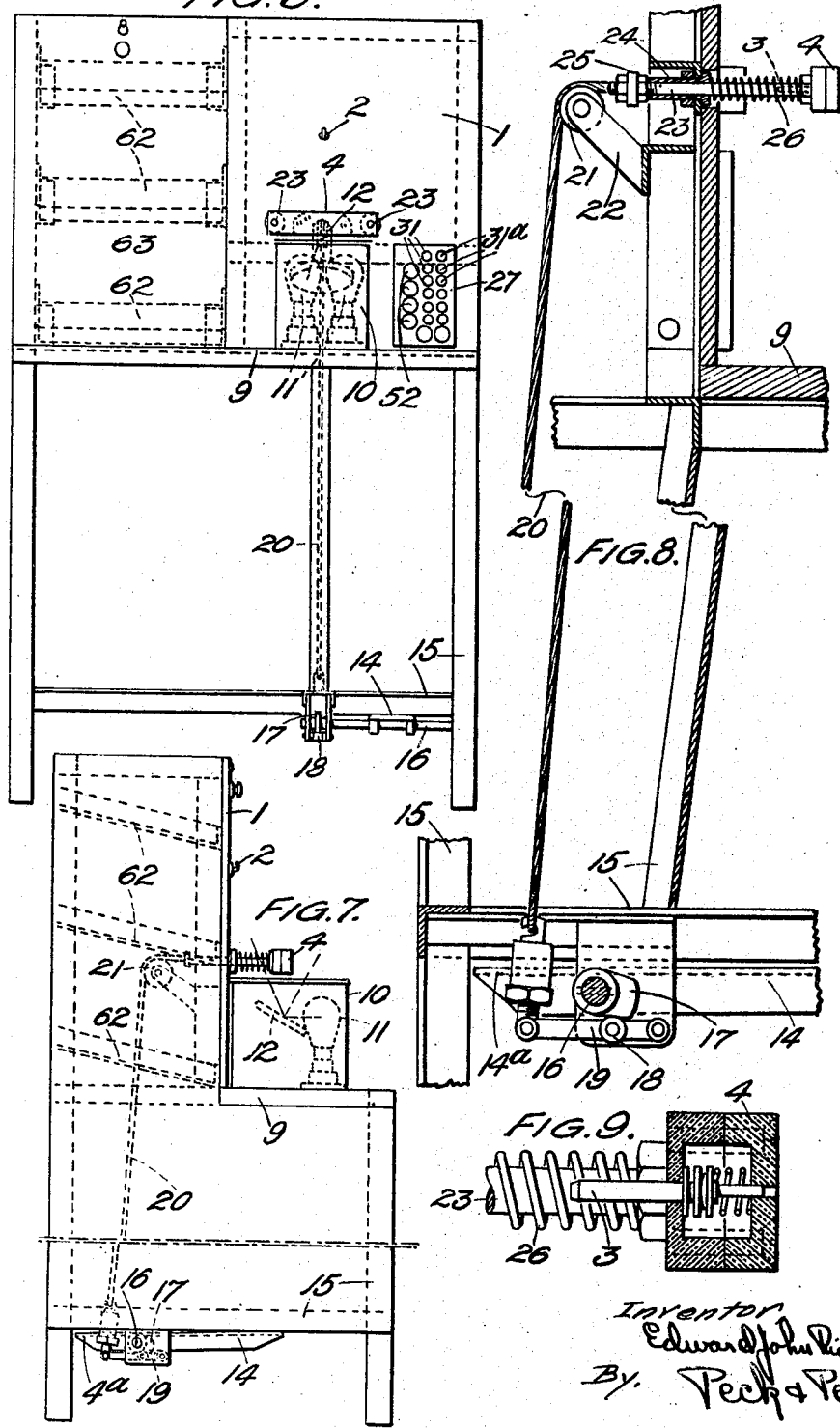

June 18, 1940.  E. J. RIORDAN  2,205,309
METHOD OF AND MEANS FOR CALIBRATING ELECTRICITY METERS
OR LIKE ELECTRICAL MEASURING INSTRUMENTS
Filed Oct. 12, 1938  4 Sheets-Sheet 4
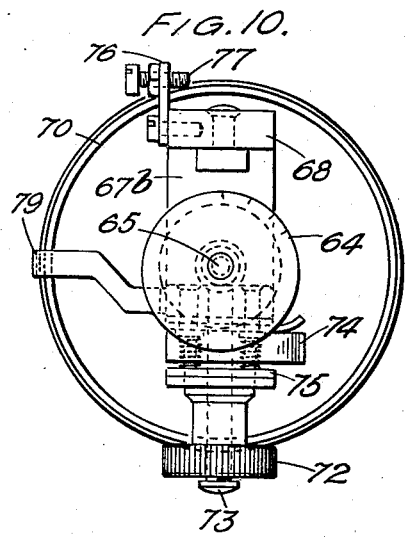
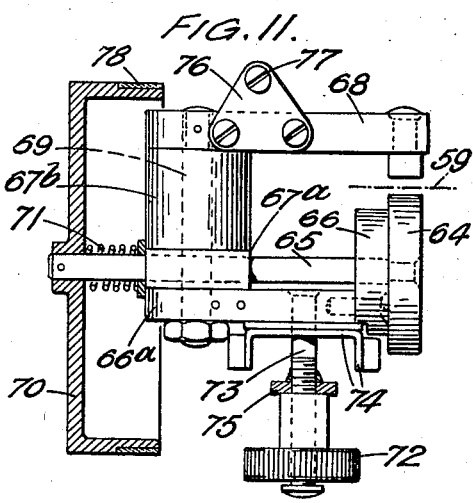
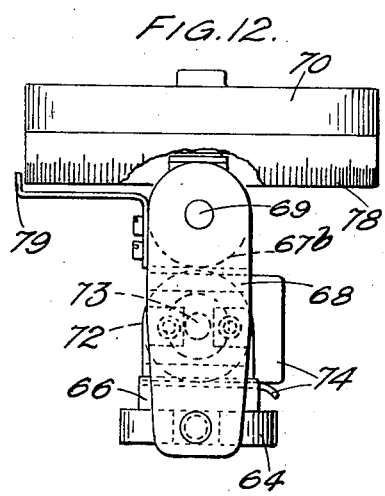
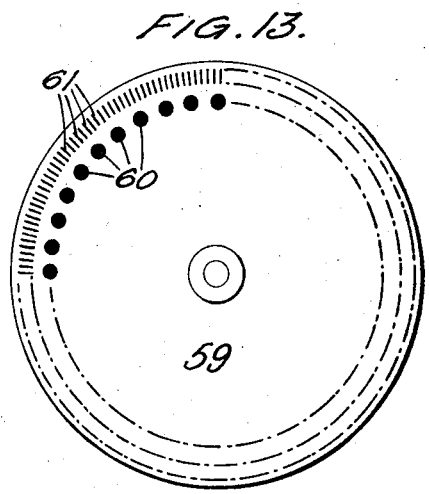
Inventor
Edward John Riordan
By Peck & Peck
Attys Patented June 18, 1940

2,205,309

UNITED STATES PATENT OFFICE 2,205,309

METHOD OF AND MEANS FOR CALIBRATING ELECTRICITY METERS OR LIKE ELECTRICAL MEASURING INSTRUMENTS

Edward John Riordan, London, England, assignor to Aron Electricity Meter Limited, London, England, a company of Great Britain, and himself Application October 12, 1938, Serial No. 234,686
In Great Britain February 24, 1938

19 Claims. (Cl. 175—183)

This invention relates to methods of and means for calibrating electrical measuring instruments of the watt-hour meter class, such as are employed as electricity meters, kva. maximum demand indicators and so on, comprising a rotor or disc which rotates during the operation of the instrument. These instruments will be generally referred to hereinafter as "watt-hour meters."

As is known, such meters must be tested under a number of different conditions and various adjustments made after or during each individual test, the conditions usually selected in this country being (i) half-load unity power factor, (ii) half-load, 0.5 power factor, (iii) one-twentieth of full load, unity power factor, and finally, when all the adjustments have been made under the preceding sets of conditions, (iv) full load, or overloads up to 100 per cent, unity power factor.

The most generally adopted method has been to run a large number of the meters under test in series with a standard or sub-standard meter, to vary the load and then carry out the adjustments on the meters under test in succession for each load applied. Such a "trial and error" method requires considerable expenditure of time and in order to obtain close accuracy repeated tests and adjustments must be made.

A more recent development is a method comprising running the meter under test in series with a standard or sub-standard meter and comparing the speeds of rotation of the respective meter discs stroboscopically, adjustments being made on the meter under test, at each loading, until synchronism is reached. On the higher loadings, not only does the stroboscope testing facilitate the adjusting of the meter to close accuracy but there is a great saving in time compared with other methods. At low loading, however, there is considerable difficulty due to the extremely low speed of rotation of the meter discs. It is necessary to allow one complete rotation of the discs to take place before it can be ascertained whether they are out of synchronism and further complete rotations must be allowed to occur after each adjustment until synchronism is found to have been reached.

It is an object of this invention to provide an improved method of calibrating watt-hour meters which shall require very little time for each test and shall, at the same time, give a high degree of accuracy. Another object is the provision of improved means of a simple character for conveniently carrying such a method into effect.

One feature of the invention is a method of calibrating watt-hour meters which is characterised in that at least the test effected at the low loading is made with the meter disc of the meter under test running at a speed higher than the normal speed for that loading.

Another feature is a method of calibrating watt-hour meters which includes the step of reducing the flux braking on the meter disc of the meter under test during at least that test carried out at the low loading.

Yet a further feature of the invention is a method of calibrating watt-hour meters comprising effecting all the tests but the final "high"-load (quarter-load upwards to 100 per cent overload) test with light braking on the meter disc of the meter under test and effecting the said final test with the full normal braking on the said meter disc.

It is also a feature of the invention to compare the speeds of rotation of the meter discs of the meter under test and of a standard or sub-standard meter connected in series therewith stroboscopically.

Other features of the invention are to be found in the means employed for carrying into effect the methods set out in the four preceding paragraphs and will appear from the detailed description given below, the broadest aspect of this part of the invention being means for facilitating the calibration of watt-hour meters comprising means for applying a light flux braking to the meter disc of each meter to be tested, in substitution for the normal and heavier flux braking of the meter construction, during the test made at the low loading. The desired result may be obtained either by providing a permanent or other magnet adapted to be substituted for the permanent magnet of the meter under test and having provision for adjusting its braking effect upon the meter disc, or by so mounting the permanent magnet of the meter under test that it may be displaced to vary its braking effect upon the disc to an extent sufficient to ensure the desired high speed of the said disc at the low loading of the meter.

The nature of the invention will be clearly understood from the following description, given with reference to the accompanying drawings, of one way in which the invention may be carried into effect. In order to simplify the description, an arrangement of apparatus will first be described and an example of the method of the invention will then be explained with reference to this apparatus which, it will be understood, is also given as a non-limitative example.

In the drawings:

Fig. 1 is a diagrammatic plan view illustrating the general lay-out of the apparatus, one "control bench" and seven "testing benches" being shown, Fig. 2 is an electric circuit diagram showing the connections between the control bench and the testing benches, Fig. 3 is an electric circuit diagram showing the connections and component elements employed within the control bench, Fig. 4 is a front elevation of the control bench, Fig. 5 is a side elevation thereof, Fig. 6 is a front elevation of a testing bench, Fig. 7 is a side elevation thereof, Fig. 8 is a broken view in sectional side elevation showing a detail of the testing bench, to a larger scale, Fig. 9 is a fragmentary view, also in sectional side elevation and to a larger scale, of another detail of the testing bench, Fig. 10 is an end elevation of an adjustable permanent magnet employed at the testing bench, taken from the right of Fig. 11, Fig. 11 if a front elevation of the magnet, partly in section, Fig. 12 is a plan view of the adjustable magnet, and Fig. 13 is an under-plan view of a meter disc showing stroboscope markings applied thereto.

The apparatus (see Fig. 1) is divided between two types of stations, namely, one station A at which is disposed a "control panel" and one, two or more stations B at each of which is located a "testing bench." In the example, the testing benches are arranged in line behind the control bench and are supplied with meters to be tested by means of an endless belt conveyor C.

The testing benches (see Figs. 6 to 9) each comprises a vertical panel 1 provided with means, such as a hook 2, for supporting a meter to be tested and having a set of spring-pressed contact plungers 3 (Fig. 9) carried on a common bar 4 of insulating material at such a location that, when the bar is moved towards the panel, the plungers 3 come to bear on the respective terminals of the terminal strip of the meter (not shown in Figs. 6 to 8 but indicated diagrammatically at D in Fig. 2). The plungers 3 are so connected to electric conductors 5, 5a and 6, 6a (Fig. 2) that the engagements of the sets of plungers in this manner at all the benches B puts all the meters D under test into circuit with means at the control panel A, the current coils 8 (Fig. 2) of the meters being connected in series across current-supply output terminals E (Figs. 2 and 3) on the control panel and the voltage coils 8 (Fig. 2) of the meters being connected in parallel across potential-supply output terminals F (Figs. 2 and 3) on the said panel.

Beneath the meter supported thereon, the panel 1 of the testing bench B carries a forwardly projecting table or shelf 9 (Figs. 6 to 8) upon which is mounted an open-topped box or casing 10 containing a source of light, preferably one or more neon lamps 11, and a mirror 12. The latter is so disposed that an operator seated at the table 9 may readily observe therein the underside of the meter disc of the meter under test. The source of light (11) is energised from the control panel, either with current of a comparatively low frequency of, say, 25 cycles per second, or with current of a higher frequency of, say, 50 cycles per second, depending upon the test to be effected. The sources of light are connected by conductors 13, 13a in parallel across output terminals G (Figs. 2 and 3) on the control panel A.

The bar 4 carrying the set of contact-plungers 3 is preferably arranged to be displaced to the operative position by actuation of a pedal 14 or the like mounted in a frame 15 supporting the panel 1 and table 9 (see Figs. 6 to 8) and to be returned to an inoperative position by spring or like means upon a further actuation of the said pedal or the like. As illustrated, the pedal 14 is secured on a rock-shaft 16 carrying a cam 17 adapted to co-operate with a roller 18 mounted intermediate of the length of a lever 19 which is pivoted to the frame 15 at its forward end and is connected at its rearward end to a cable 20. The said cable extends upwardly to a pulley 21 supported in a bracket 22 on the rear of the panel 1 and then passes over the pulley to be attached to the bar 4. The latter is secured at its ends on the front ends of pins 23 which pass through guide tubes 24 (Fig. 8) mounted in the panel 1 and are provided at their rear ends with stops 25. Around the pins 23 and between the bar 4 and the panel 1 are located compression springs 26. The pedal 14 has a tail-piece 14a located to the rear of the rock-shaft 16. Depression of the pedal 14 rocks the cam 17 clockwise to depress the lever 19 and thus exert a pull on the cable 20 which causes it to draw the bar 4 towards the panel against the action of the springs 26. Depression of the tail-piece 14a of the pedal rocks the cam 17 anti-clockwise to permit the springs 26 to return the bar 4 to its inoperative position. The shape of the cam 17 is such that after the depression of the pedal 14 it locks the lever 19 in the depressed position until such time as pressure is exerted on the tail-piece 14a. Within easy each of the operator seated at the testing bench there is provided an indicator panel 27 (Figs. 2 and 6) and a change-over switch 28 (see Fig. 2). Each switch 28 controls a corresponding pair of indicator elements both in each of the bench indicator panels 27 and in a further indicator panel 29 (Figs. 2 and 4) provided at the "control" station A.

A form of indicator panel suitable for six testing benches is illustrated and is substantially identical for both testing benches and control bench. It comprises two rows of lamps 30, 30a (Fig. 2) located behind coloured windows, each row being associated with windows 31 or 31a (Figs. 4 and 6) of a particular colour and having one lamp for each testing bench B and one lamp for the control panel A. Those lamps in all the indicators 27, 29 which correspond to a particular testing bench are controlled by the respective switch 28 at that bench, the switch in one position lighting the lamp in one row 30 (to show a green light for example) and in the other position lighting the lamp in the other row 30a (to show a red light for example). At the control panel A there is a further change-over switch 32 (Fig. 2) which, in one position, controls the corresponding lamp of one row (30) in each of the indicator panels and, in the other position, controls the corresponding lamp of the other row (30a) in each indicator panel. The current supply for the lamps 30, 30a is derived from a transformer 33 (Fig. 2) located at the control bench.

The "control panel" (see Figs. 3 to 5) comprises a pair of sub-standard meters W, W (shown diagrammatically in Figs. 2 and 3) which are permanently mounted side-by-side within a chamber 34 (Figs. 4 and 5) above an open-topped box or casing 35 containing a source of light (shown as four neon lamps 36, two to each meter) adapted to be energised with current of the one or other frequency in common with the sources of light 11 at the testing benches B. An inclined mirror 37 (Figs. 4 and 5) is provided beneath each meter so that the operator at the control panel may readily view the undersides of the meter discs when required. The panel (see Fig. 3) also includes a source of supply H of electric current of the low frequency and a separate source of supply I of electric current of the higher frequency. In addition, a phase-shifting circuit (indicated generally in Fig. 3 by 38) and load resistances 39, 40, 41, 42 are provided, together with a potential transformer 43 having a tapped secondary winding, a current transformer 44 and a precision current-transformer 45. The effective portion of the secondary winding of the potential transformer 43 supplies the terminals F across which is connected a voltmeter 43a and the current and precision transformers 44, 45 supply the terminals E.

A multi-contact switch having four positions is provided at the control panel and is preferably operated by a controlling handle 46 (Fig. 4) which is adapted to be engaged in any one of a series of four notches formed in one edge of a slot along which the handle may slide (the notches and slot not being shown). The engagement of the handle in each notch corresponds to one setting of the multi-contact switch. The switch comprises four sets of moving contacts 47 to 50c (illustrated in Fig. 3 in the positions they occupy in the first position of the switch), the first set consisting of two arms 47, 47a normally occupying the dotted line positions, the second set consisting of four arms 48, 48a, 48b, 48c normally occupying the positions shown, the third set consisting of three arms 49, 49a, 49b normally occupying the positions shown in the fourth set consisting of four arms 50, 50a, 50b, 50c also normally occupying the positions shown. The arms 47, 48, 49, 50 each, in the operative position, cause current to be supplied from the transformer 33 to the corresponding lamp of a series 51 (Fig. 2) provided at each indicator panel 27, 28, the lamps 51 illuminating windows 52 (Figs. 4 and 6) bearing appropriate indications of the loading applied for each setting of the switch. In Fig. 2, for the sake of clearness, the functions of the switch arms 47, 48, 49, 50 are assumed to be carried out by a single arm 47b co-operating with a number of contacts.

In the first position of the multi-contact switch controlled by the handle 46 as aforesaid, the arm 47a establishes a supply from the souce I, through load resistance 39 and ammeter 53, to the current transformer 44, whereas a supply is also established through the arm 48b to the potential transformer 43. The supply thereby established to the meters at the testing benches and also the sub-standard meters at the control bench gives approximately half-load, unity power factor conditions. At the same time, by reason of the arms 49a, 50a and 50b and the secondary winding 54 provided on the inductive-loading element of the phase-shifting circuit 38, all the light sources 11 and 36 are supplied with current of the higher (50 cycle) frequency. In the second position of the switch, the arm 48c establishes a supply from the source I, through load resistance 40 and ammeter 53, to the current transformer 44, whereas a supply is also established through the phase-shifting circuit 38 and arms 48a, 48b to the potential transformer 43. The supply thereby established to the meters at the testing and control benches gives approximately half-load, 0.5 power factor conditions, the light sources being supplied as before with current of the higher frequency. In the third position of the switch, the arm 49b establishes a supply from the source I, through the load resistance 41 and ammeter 53, to the current transformer 44, whereas the supply to the potential transformer 43 is effected as for the first position of the switch. The supply thereby established to the meters at the testing and control benches gives approximately one-twentieth load, unity power factor conditions. In this case, however, the supply to the light sources 11 and 36 is established direct from the lower frequency (25 cycle) source H by way of the arms 49a and 50b. In the fourth position of the switch, the arm 50c establishes a supply from the source I, through load resistance 42 and ammeter 53, to the current transformer 44 and the supply to the potential transformer 43 is effected as for the first position of the switch. The supply thereby established to the meters gives approximately three-fifths load, unity power factor conditions and all the light sources 11 and 36 are again supplied with current of the lower frequency, this time by way of arms 49a, 50a and 50b.

Selection of the appropriate tapping on the secondary winding of the potential transformer 43 is effected to correspond with the voltage rating of the meter D under test, the appropriate potential being thereby applied to each of the potential coils 8 of these meters and also to the potential coils 8a of the sub-standard meters W at the control panel.

In order that meters D of very different current-carrying capacities may be tested without difficulty by means of the apparatus described, the supplies established by the multi-contact switch in all of its positions reach the meters under test by way of the current transformer 44 and a selector switch 55 (shown in Fig. 3 with its two coaxial connected switch arms spaced apart). The various currents corresponding to the settings of the multi-contact switch are each supplied to the primary of the current transformer 44 and a resistance 56 connected in series therewith. The selector switch 55 is adjusted to vary the amount of this resistance left in circuit and simultaneously (but in the same sense) the number of turns of the secondary of the transformer 44 left in circuit with the current coils of the meters (which would then be connected appropriately and not as shown) so that a current of the desired magnitude will flow in the secondary of the current transformer. This adjustment is, of course, only effected before meters are to be tested and not during the testing operations. Means for effecting a fine adjustment of the value of the current flowing in the secondary of the current transformer 44 is also provided in the form of a variable resistance 57 connected across the primary of the said transformer and its series-connected resistance 53. The slider of the resistance 57 is controlled by rotation of a hand-wheel 58 provided at the front of the control bench A (Fig. 4).

A further simplification of the apparatus, which is preferred though not necessary, is obtained by utilising one and the same pair of sub-standard meters W at the control panel irrespective of the different current-carrying capacities of the various types of meters D to be tested. This is made possible by providing the precision current transformer 45 having its primary winding 45a connected in series with the secondary winding of the current transformer 44 and its secondary winding 45b connected in series with the current coils 7a of the two sub-standard meters W, the number of turns of the said primary winding included in circuit being varied in the same sense and proportion as the number of turns of the secondary winding to which it is connected. This variation is effected by the same selector switch 55 and results in the sub-standard meters W always operating on the same range of current variations (say up to a maximum of 2.5 amperes) for different ranges of current variations employed for testing the meters D (say up to maxima of 2.5, 5, 10, 25, 50 or 100 amperes).

One of the sub-standard meters W is of the same construction as the meters D to be tested or calibrated so that its meter disc will run at the speed normal for such meters. This sub-standard will be referred to herein as the "normal sub-standard." The other sub-standard, however, although of otherwise similar construction, has only light braking on its meter disc so that this will run at a speed much higher than the said normal speed for the same loading. To be in accordance with the numerical example chosen for this description the higher speed would be ten times that of the disc of the normal sub-standard. This second sub-standard will be referred to herein as the "fast sub-standard."

The meter discs 59 (see Fig. 13) of both the sub-standards W and also all the meter discs 59 fitted to the meters D to be calibrated are provided on their undersides with two concentric sets of markings 60 and 61, one (60) few in number to be observed at high speeds of the discs and one (61) comprising a much larger number of marks to be observed at the lower speeds of the discs. In the numerical example chosen, the set of markings 60 would consist, say, of 40 black dots evenly spaced around the disc at a short distance from its edge and the other set 61 would then consist, say, of 200 radial black lines evenly spaced around the extreme marginal portion of the disc.

A meter D to be calibrated is mounted upon the panel 1 of each testing bench B and an adjustment is made (under conditions to be described in connection with the method) whereby the braking on its meters disc 59 is reduced to an extent such that this will rotate at a speed much higher than the normal speed (in the numerical example chosen this speed would be ten times the said normal speed). In order that this adjustment may readily be effected, it is preferred to supply the meters D to the testing benches B without the permanent magnets first being fitted and to supply a number of the said magnets to each bench B for storage in a rack or the like so that they may be fitted as required. Three such racks are shown at 62 in Figs. 6 and 7 within a compartment having an easily removable door 63. Each operator at the testing benches is also supplied with a permanent magnet adapted to be readily and detachably fitted on the support for the meter magnet but having one pole, say the lower pole, adjustable to vary the gap between it and the other pole. A suitable magnet construction is illustrated in Figs. 10 to 12 and has a pole piece constituted by a cam 64 secured on a spindle 65 rotatably engaged in bearings formed in an end-piece 66 on the lower pole 66a and in a soft-iron portion 67a which together with a nickel-aluminium-steel permanent magnet 67b constitutes the yoke-piece 67a, 67b extending between the two poles 66a and 68. The poles are connected by a bolt 69. The free end of the spindle 65 carries an operating drum 70 and a compression spring 71 (Fig. 11) is provided between the drum and the yoke-piece to urge the pole piece 64 against the outer face of the end-piece 66 on the lower pole 66a of the magnet. The adjustable magnet is adapted to be secured on the usual magnet support 10 (not shown) of the meter under test by means of a clamping nut 72, working on a screw 73, and guiding and clamping members 74, 75. Correct positioning of the magnet may be facilitated by providing a bracket 76 on the upper pole 68 to carry a set-screw 77 adapted to bear on a fixed part of the meter construction. When the adjustable magnet is secured on the magnet support of the meter, the opposed upper pole 68 and lower cam pole-piece 64 receive between them a marginal portion of the meter disc 59, the edge of the cam being presented to the disc. Rotation of the cam pole-piece 64 by means of the operating drum 70 varies the distance between the lower face of the disc 59 and the adjacent edge of the cam pole-piece and consequently varies the braking action exerted by the magnet on the disc.

An alternative (but not illustrated) way of achieving the same result is to construct the meters to be calibrated with a magnet support which is such that the normal meter magnet may be adjusted rotatably thereon to move its poles outwardly relatively to the meter disc and thus reduce the effective braking action exerted on the disc.

The method of calibrating a meter in accordance with this invention is carried out as follows, the numerical example being chosen for convenience of description and not being limitative of the invention.

At the control panel A the operator sets the devices 43 and 55 controlling the potential and the range of variation of the current to be supplied to the testing benches to accord with the rating of the meters D to be calibrated. Meanwhile, at each of the testing benches B, the operator plates a meter D on the panel 1, fits the adjustable permanent magnet (when this is employed) and actuates the contact-plungers 3 to the operative position, thus connecting the meter D into the testing circuits. As soon as this is effected the operator operates his switch 28 in the one direction and thereby causes the showing of a green light (at a position corresponding to his bench) at the indicator panels 27 of all testing benches B and also at the indicator panel 29 of the control panel A.

When all the green lights are showing, the operator at the control panel actuates the multi-contact switch to its first position and observes, in the appropriate mirror, the series of 40 dots on the underside of the disc of the fast sub-standard, such observation taking place in light of 50 cycle frequency. He then operates the fine adjustment 58 controlling the current supplied to the meters until the dots appear to be stationary and thereupon operates his signalling switch 32 to one of its positions to cause a red light to show (at a position corresponding to the control panel) at the indicator panel 27 of each testing bench, and also at his own indicator panel 29.

The operator at each testing bench B then adjusts the braking on the disc of the respective meter D, by either of the means described above, until the dots 60 on the underside of the disc 59 appear to be stationary. He then operates his switch 28 to the other of its positions to cause a red light to show at each indicator panel 27 and 29 (the corresponding green light being then extinguished) and, when all the red lights are showing, the operator at the control panel A knows that all the meters D are adjusted to have the same braking as the fast sub-standard.

Thereupon the operator at the control panel actuates the multi-contact switch to the second position and operates the fine adjustment 53 (if necessary) until the dots 60 on the disc 59 of the fast sub-standard again appear to be stationary. He then signals to the benches B by causing a green light to show at each, at a position corresponding to the control panel, and the operators at these stations then adjust the positions of the quadrature loops on their meters until the dots 60 on the discs thereof appear to be stationary. As before, completion of the operation is signalled to the control panel A.

The next step is the actuation of the multi-contact switch at the control panel A to the third position and the making of a fine adjustment as before until the lines 61 of the series of 200 lines on the disc 59 of the fast sub-standard appear to be stationary (the viewing being effected now in light of 25 cycle frequency).

After the appropriate signal has been given, the operators at the testing benches B adjust the low-load bar on their meters D until the lines 61 on the meter discs also appear to be stationary.

After the full number of appropriate signals has been given, the operator at the control panel A actuates the multi-contact switch to its fourth position and makes an adjustment as above until the lines 61 on the disc of the normal sub-standard appear to be stationary (in light of 25 cycle frequency). He then signals to the operators at the testing benches B who have meanwhile replaced the adjustable braking magnet by a normal braking magnet, or, alternatively, have returned the normal magnet to approximately its normal position as the case may be. Each of these operators then adjusts the position of the normal magnet until the lines 61 on the meter discs appear to be stationary, the calibration of the meter than having been completed.

A meter which has thus been adjusted for inaccuracies while the disc is running at a speed in excess of the normal speed due to a reduction in the braking thereon may be found still to be correctly adjusted for these inaccuracies when subsequently tested with the disc running at the normal speed under the action of the normal braking effect.

This is not necessarily the case, however, since the relationship between the accuracies of the high speed motor at various loads is not the same as the relationship between the accuracies for the same loads on low speeds. The method of calibration is not thereby affected because the meters under test are of similar construction to the sub-standards and give similar performances on both low speed and high speed. All that is required in practice is that, for any particular type of construction, meters having similar permissible errors at the higher speed of the disc shall behave alike when the speed is reduced to the normal value although the permissible errors for different loads in a meter calibrated at the higher speed may have one relationship to each other at the said higher speed and another relationship to each other at the normal speed. It is only necessary, therefore, to calibrate the sub-standards accurately at the respective normal and high speeds, the fast sub-standard being calibrated in the first instance at the normal or lower speed and the braking then being reduced in order to increase the speed to the required value. The meters under test when calibrated at the higher speed will then give the same performance at the normal speed at the sub-standards (of the same type) will give at this speed.

When the meters are to be tested "cold," that is without previous application of the potential, which would normally cause a temperature rise and possibly a slight alteration in the characteristic of the meter, due allowance is preferably made for this temperature effect in the calibration of the sub-standards so that the meters under test, after calibration, will be accurate under working conditions of continuously applied potential. The time required for effecting all the steps of the method according to the invention is relatively short since all adjustments are made while the meter discs are running at a relatively high speed. In addition the degree of accuracy obtained is high.

A further advantage which can be had, when use is made of the adjustable permanent magnet described with reference to Figs. 10 to 12, is that the strength of the normal permanent magnet required to be fitted to a meter D to produce the best results may readily be determined during the first step of the method. For this purpose the operating drum 70 on the adjustable magnet is graduated, as at 78, and a pointer 79 is provided on the magnet itself to co-operate with the graduations. In addition provision is made for the adjustable magnet always to be engaged with the magnet supports of the meters D in a predetermined relationship, as by means of the set-screw 77 (Figs. 10 and 11). The scale 78 on the drum 70 is suitably calibrated to read directly in strengths of magnets.

The modification in the method consists in placing the adjustable magnet on the magnet support of the meter under test as for the first step in the calibration described above but with the drum 70 set with the zero mark opposite the pointer 79. When the first step is effected in the manner already described, i. e. when the drum 70 has been rotated until the dots 60 on the meter disc 59 appear to be stationary, the strength of magnet required is read off directly from that graduation 78 on the drum 70 which is now opposite to the pointer 79.

The further steps in the calibration method are carried out as before but when a normal permanent magnet has to be fitted for the last test the operator can immediately choose one of the correct strength from the rack 62 at the testing bench B, the magnets supplied being marked with indications of their strengths. A considerable saving in time may be effected by this operation since the strength of one of the permanent magnets may sometimes be such that the range of the adjustment provided on the meter is insufficient to correct the speed of the meter disc.

Although reference has been made throughout the description given above to standard or sub-standard meters it should be noted that this invention may be carried into effect without employing such standards or sub-standards, for example, use may be made of indicating wattmeters, the meter discs being observed in a light of a definite constant frequency.

In addition, the control of the flux braking on the meter discs of the meters under test may be effected by the aid of electromagnets instead of permanent magnets, the flux being varied either by controlling the current flowing in the coil of the electromagnet or by altering the electromagnet gap. These coils may be supplied with direct or alternating current as desired.

The particular example which has been described herein employs light of two different frequencies, namely 25 and 50 cycles per second, but lower or higher frequencies may be adopted provided that the number of the stroboscope markings 60 and 61 on the meter discs 59 be appropriately chosen. For example, it may be thought to be preferable to increase the number of lines 61 on the discs from 200 to 400 (in the numerical example given above) and to observe the discs throughout the calibration in light of a frequency of 50 cycles per second only. The light sources 11 and 36 may be supplied with interrupted direct current of equivalent periodicity to the alternating current which would otherwise be employed. It is found that, when the discs are observed in light from sources fed from an interrupted D. C. supply corresponding to an A. C. supply of 25 cycles per second, the images are clearer than those observed in light from sources fed from the said A. C. supply.

It is preferred in some cases to dispense with the lines 61 on the meter disc 59 of the normal sub-standard and to increase the speed of the said disc to an extent permitting of viewing the markings 60 in light of 50 cycles frequency. It is not essential that the normal sub-standard should rotate at its normal speed but simply that the load applied thereto should correspond with the predetermined load at which the meters must be calibrated.

The method according to the invention may also be employed for calibrating polyphase meters, in which case it is particularly desirable that the meters shall be calibrated only after they have been energised for some time in order to avoid disturbances due to heating effects subsequent to calibration. For this purpose and in order to avoid complications (since more complicated connections have to be provided for polyphase meters than for single-phase meters) a number of the meters are connected in series on a test rack and a common casing is provided beneath them for illuminating their discs. The casing is of elongated trough-shape and contains a row of neon lamps with a strip mirror. In carrying out the calibration, each meter is fitted with a high-speed magnet and an ordinary single-phase or 3-phase testing set may be employed. In this way as many as, say, 10 or 15 meters may simultaneously be submitted to the same series of operations, the adjustments being effected on the meters in succession until their discs all rotate at the desired speed. A plurality of single-phase meters may also be calibrated in this way, if desired.

An additional advantage arising from the arrangement of the means for viewing and illuminating the meter discs which has been described is that such viewing may be carried out in an ordinary room illuminated by diffused daylight or artificial light without any difficulty.

The method according to the invention may also be applied with advantage to various other electrical measuring instruments having a rotary element, such as kva. maximum demand indicators, which, by reason of their similarity to electricity meters in construction and characteristic, may be expected to have similar modified characteristics when the braking fluxes are reduced and the speed of the rotary element is increased.

What I claim is:

1. A method of calibrating watt-hour meters which comprises testing the meter at different loadings and making any calibration adjustment required to bring the meter rotor to a predetermined calibration speed for each loading, characterised by the selection for at least one of the loadings of a calibration speed which is higher than the normal speed of the fully calibrated meter for that loading so that the making of any calibration adjustment required at the said loading will be facilitated.

2. A method of calibrating watt-hour meters having flux braking on the meter rotors, which comprises testing the meter at different loadings and making any calibration adjustment required to bring the meter rotor to a predetermined calibration speed for each loading, characterised by the step of reducing the flux braking on the meter rotor during at least the test carried out at one of the loadings in order to cause the said rotor to run at a speed which is higher than the speed of the rotor of a fully calibrated meter for that loading.

3. A method of calibrating watt-hour meters having flux braking on the meter rotors comprising testing the meter at different loadings ranging from a low loading to a final "high"-loading and making any calibration adjustment required to bring the meter rotor to a predetermined calibration speed for each loading, wherein all the tests but the said final test are effected with light braking on the meter rotor and the said final test is effected with the full normal braking on the said meter rotor.

4. A method of calibrating watt-hour meters having flux braking on the meter rotors comprising subjecting a number of the meters together to a plurality of loadings in succession, one loading being a low loading and the final loading being a high loading, reducing the flux braking on the rotors to a predetermined value for the first loading and maintaining it at this value for all the succeeding loadings except the last, and making any necessary adjustments in the meters at each of the loadings after the first, including the low loading, to correct for errors which may be present, the full normal flux braking being employed at the last loading and the final adjustment being made by varying the said braking.

5. A method as claimed in claim 4, including determining the correct settings of the flux braking and the correct adjustments in the meters by observing the speeds of the meter rotors at each loading.

6. A method of calibrating a watt-hour meter comprising subjecting the meter and a plurality of standard meters simultaneously to the same or equivalent loadings, arranging at least one of the standard meters so that its rotor will run at speeds higher than the normal speeds of the rotor of a fully calibrated meter for any of the said loadings, arranging another standard meter so that its rotor will run at other speeds than the rotor of the first-mentioned standard for the same loadings, making any calibration adjustments required to bring the rotor of the meter under test to a speed equivalent to that of the rotor of the first-mentioned standard meter while subjected to at least one of the loadings and making any further calibration adjustments required to bring the rotor of the meter under test to a speed equivalent to that of the rotor of the second-mentioned standard meter while subjected to at least another of the said loadings.

7. A method as claimed in claim 6, in which equivalence between the speed of the rotor of the meter under test and the speed of the rotor of the respective standard meter is determined stroboscopically.

8. A method of calibrating watt-hour meters having flux braking on the meter rotor comprising mounting a meter at a testing location, mounting two sub-standard meters having a relatively light and a normal flux-braking, respectively, at a control location, connecting the current coil of the meter to be tested across current-supply terminals at the control location, connecting the current coils of the sub-standard meters in series and so that they are always supplied with a current equal or proportional to that being delivered to the current coil of the meter to be tested, varying the current and potential supplies at the control location to give at the meter to be tested, in succession, medium load, unity power factor conditions, medium load, 0.5 power factor conditions, low load, unity power factor conditions and "high" load, unity power factor conditions, reducing the flux-braking of the meter to be tested while it is subjected to the first set of conditions until its rotor rotates at the same speed as that of the sub-standard with the relatively light flux-braking, adjusting the quadrature-loop on the meter to be tested while it is subjected to the second set of conditions until its rotor rotates at the same speed as that of the sub-standard with the relatively light flux-braking, adjusting the low-load bar on the meter to be tested while it is subjected to the third set of conditions until its rotor rotates at the same speed as that of the substandard with the relatively light flux-braking, and increasing and adjusting the flux-braking of the meter to be tested while it is subjected to the fourth set of conditions until its rotor rotates at the same speed as that of the sub-standard with the normal flux-braking.

9. Means for facilitating the calibration of watt-hour meters having flux braking on the meter rotor by the method as claimed in claim 1, comprising means for applying a light flux braking to the meter rotor, in substitution for the normal and heavier flux braking of the meter construction, during at least the test made at the high calibration speed.

10. Means for facilitating the calibration of watt-hour meters having flux braking applied to the meter rotor by a permanent magnet, comprising a magnet adapted to be substituted for the permanent magnet of the meter under test and having provision for adjusting its braking effect upon the meter rotor to an extent sufficient to cause the said rotor to run at a speed higher than than that of the rotor of a fully calibrated meter subjected to an equivalent loading.

11. Means as claimed in claim 10, wherein the adjustable magnet has means for varying the gap between its poles.

12. Means for facilitating the calibration of watt-hour meters comprising a control panel, at which is located means for supplying desired given loadings to the meters to be tested, at least one testing bench having means for supporting one of the said meters, electrical connections between the control panel and the testing bench and controllable means at the testing bench for connecting the said electrical connections to the meter in one operation including a plurality of plungers carried by a common member and each attached to one of the connections leading to the control panel and means for moving the common member towards the meter to cause the plungers to come to bear on respective terminals of a terminal strip of the meter.

13. Means as claimed in claim 12, wherein the means for moving the common member towards the meter comprises a pedal-operated cam adapted to depress a lever connected by a flexible member to the common member, the latter being returned by spring means upon a further actuation of the cam.

14. Means for facilitating the calibration of watt-hour meters comprising a control panel, at which is located means for supplying desired given loadings to the meters to be tested, at least one testing bench having means for supporting one of the said meters, electrical connections between the control panel and the testing bench and controllable means at the testing bench for connecting the said electrical connections to the meter, wherein there is also located at the control panel at least one standard or sub-standard meter, means for supplying it with loadings equal or proportionate to those supplied to the meter at the testing bench and means for effecting a fine adjustment of the load at each loading.

15. Means for facilitating the calibration of watt-hour meters comprising a control panel, at which is located means for supplying desired given loadings to the meters to be tested, at least one testing bench having means for supporting one of the said meters, electrical connections between the control panel and the testing bench and controllable means at the testing bench for connecting the said electrical connections to the meter, wherein there is also located at the control panel at least one standard or sub-standard meter, means for supplying it with loadings equal or proportionate to those supplied to the meter at the testing bench and means for effecting a fine adjustment of the load at each loading, and the load-supplying means for the meters to be tested and the standard or sub-standard meter comprises a source of supply of electric current, a phase-shifting circuit and load resistances, switch means for establishing different sets of electrical connections between the said source and the other elements so that the desired loadings are supplied to the meter at the testing bench, a potential transformer having a tapped secondary winding feeding certain of the electrical connections between the control panel and the testing bench and a primary winding supplied from the said source, and a current transformer having a primary winding selectively connected to the source of current through the appropriate load resistance and a secondary winding feeding the meter to be tested.

16. Means as claimed in claim 15, including a precision current transformer having its primary winding connected in series with the current coil of the meter to be tested and the secondary winding of the current transformer and its secondary winding connected in series with the current coil of the said standard or sub-standard meter, and means for varying in the same sense and proportion the number of turns of both the primary winding of the precision current transformer and the secondary winding of the current transformer left in circuit so that the same standard or sub-standard meter may be employed irrespective of the current-carrying capacities of the various types of meters to be tested.

17. Means for facilitating the calibration of watt-hour meters comprising a control panel, at which is located means for supplying desired given loadings to the meters to be tested, at least one testing bench having means for supporting one of the said meters, electrical connections between the control panel and the testing bench and controllable means at the testing bench for connecting the said electrical connections to the meter, including means at both the control panel and the testing bench for permitting of the viewing of stroboscope markings on the rotors of the meters in a light of a predetermined frequency for each loading, such means comprising a light source at the testing bench and the control panel, means at the latter for supplying all the light sources with current of the predetermined frequency at the same time and mirrors wherein the stroboscope markings are viewed by reflection.

18. A method of calibrating watt-hour meters which comprises testing the meter at different loadings including a low loading and making any calibration adjustment required to bring the meter rotor to a predetermined calibration speed for each loading, characterised by the selection for at least the low loading of a calibration speed which is higher than the normal speed of the fully calibrated meter for that loading so that the making of any calibration adjustment required at the said low loading will be facilitated.

19. A method of calibrating watt-hour meters having flux braking on the meter rotors, which comprises testing the meter at different loadings including a low loading and making any calibration adjustment required to bring the meter rotor to a predetermined calibration speed for each loading, characterised by the step of reducing the flux braking on the meter rotor during at least the test carried out at the low loading in order to cause the said rotor to run at a speed which is higher than the speed of the rotor of a fully calibrated meter for that loading.

EDWARD JOHN RIORDAN.